(12) United States Patent
Kim

(10) Patent No.: US 10,233,995 B2
(45) Date of Patent: Mar. 19, 2019

(54) SHOCK ABSORBER FOR RAILWAY VEHICLE

(71) Applicant: MANDO CORPORATION, Pyeongtaek-si, Gyeonggi-do (KR)

(72) Inventor: Nam Ho Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/459,615

(22) Filed: Mar. 15, 2017

(65) Prior Publication Data

US 2017/0268593 A1    Sep. 21, 2017

(30) Foreign Application Priority Data

Mar. 17, 2016 (KR) .................. 10-2016-0032197
Mar. 17, 2016 (KR) .................. 10-2016-0032200

(51) Int. Cl.
| F16F 9/348 | (2006.01) |
| F16F 9/19 | (2006.01) |
| F16F 9/32 | (2006.01) |
| F16F 15/023 | (2006.01) |

(52) U.S. Cl.
CPC ............ *F16F 9/3484* (2013.01); *F16F 9/19* (2013.01); *F16F 9/3214* (2013.01); *F16F 9/3235* (2013.01); *F16F 15/023* (2013.01); *F16F 2222/12* (2013.01); *F16F 2232/08* (2013.01)

(58) Field of Classification Search
CPC .......... F16F 9/34; F16F 9/3482; F16F 9/3484; F16F 9/3488; F16F 9/348; F16F 9/19; F16F 9/3214; F16F 9/3235; F16F 15/023; F16F 2222/12; F16F 2232/08

USPC .................................... 188/313, 315
See application file for complete search history.

(56) References Cited

U.S. PATENT DOCUMENTS

| 5,529,154 A * | 6/1996 | Tanaka .................. F16F 9/348 188/280 |
| 6,460,664 B1 * | 10/2002 | Steed ..................... F16F 9/348 188/282.1 |
| 2015/0337918 A1 * | 11/2015 | Rummel ............... B60G 13/08 188/315 |

FOREIGN PATENT DOCUMENTS

| EP | 1148268 A2 | 10/2001 |
| JP | H03-199733 A | 8/1991 |
| JP | 2010-538218 A | 12/2010 |
| JP | 2011-058562 A | 3/2011 |
| WO | 2015/179477 A1 | 11/2015 |

OTHER PUBLICATIONS

Office Action issued in corresponding Korean Patent Application No. 10-2016-0032197, dated Sep. 11, 2017.
Office Action issued in corresponding Korean Patent Application No. 10-2016-0032200, dated Sep. 11, 2017.
(Continued)

*Primary Examiner* — Robert A. Siconolfi
*Assistant Examiner* — San M Aung
(74) *Attorney, Agent, or Firm* — Morgan Lewis & Bockius LLP (57) ABSTRACT

Provided is a shock absorber for a railway vehicle, in which an eccentric disk is disposed on a rear surface of a valve disk to set a supporting force for an initial opening position of the valve disk to a relatively low value and continuously open the valve disk from the initial opening position of the valve disk during strokes, thereby controlling a damping force in a low speed section and realizing a soft damping force.

8 Claims, 8 Drawing Sheets

(56) References Cited

OTHER PUBLICATIONS

Office Action issued in corresponding German Patent Application No. 102017002566.5, dated Oct. 20, 2017.
Chinese Office Action dated Jun. 27, 2018 issued in Chinese Patent Application No. 201710160303.3.

* cited by examiner

SHOCK ABSORBER FOR RAILWAY VEHICLE

CROSS-REFERENCE(S) TO RELATED APPLICATION

This application claims the benefit of Korean Patent Application Nos. 10-2016-0032197, filed on Mar. 17, 2016, and 10-2016-0032200, filed on Mar. 17, 2016, in the Korean Intellectual Property Office, the disclosures of which are incorporated herein in their entirety by reference.

BACKGROUND OF THE INVENTION

Field of the Invention

The present invention relates to a shock absorber for a railway vehicle, and more particularly, to a shock absorber for a railway vehicle, in which an eccentric disk is disposed on a rear surface of a valve disk to set a supporting force for an initial opening position of the valve disk to a relatively low value and continuously open the valve disk from the initial opening position thereof during strokes, thereby controlling a damping force in a low speed section and realizing a soft damping force.

Description of the Related Art

Generally, a shock absorber for a railway vehicle, which absorbs a shock, is used in a connection mechanism between trucks or carriages of the railway vehicle.

The shock absorber for the railway vehicle includes a cylinder filled with a working fluid and having one end connected to the railway vehicle, a piston valve partitioning the interior of the cylinder into a compression chamber and a rebound chamber and generating a damping force, and a piston rod performing compression and rebound strokes in a state of being connected to the piston valve.

The piston valve includes a body partitioning the interior of the cylinder into the compression chamber and the rebound chamber and having a main passage formed therein, and valve disks connected to upper and lower surfaces of the body in multiple layers and opening/closing the main passage.

That is, an existing piston valve has a structure in which a fluid moving through a main passage during compression and rebound strokes generates a damping force while pushing and opening a valve disk and moving toward a compression chamber or a rebound chamber.

However, in the existing piston valve, a fluid may be discontinuously discharged because an initial opening position of the valve disk is not specified during compression and rebound strokes. Thus, a discontinuous blow-off phenomenon may occur when the valve disk is opened. In addition, it is difficult to realize damping force characteristics in a low speed section.

As one of prior art documents related to the present invention, Korean Patent Application Publication No. 10-2011-0089078 (published on Aug. 4, 2011) discloses a shock absorber.

SUMMARY OF THE INVENTION

An aspect of the present invention provides a shock absorber for a railway vehicle, in which an eccentric disk is disposed on a rear surface of a valve disk to set a supporting force for an initial opening position of the valve disk to a relatively low value and continuously open the valve disk from the initial opening position of the valve disk during strokes, thereby controlling a damping force in a low speed section and realizing a soft damping force due to nonoccurrence of a blow-off phenomenon.

According to an embodiment, a shock absorber for a railway vehicle includes: a piston valve partitioning interior of a cylinder into a compression chamber and a rebound chamber, the cylinder being filled with a fluid, wherein the piston valve includes: a body defining a main passage through which the fluid moves during compression and rebound strokes; a valve disk closely contacting upper and lower portions of the body to block an outlet side of the main passage and opening the outlet side of the main passage to generate a damping force during compression and rebound strokes; and an eccentric disk closely contacting and supporting a rear surface of the valve disk at the upper and lower portions of the body, wherein an asymmetric end portion on one side of an edge of the eccentric disk is spaced apart from a center of an initial opening position of an edge of the valve disk in a direction opposite to the initial opening position, and the valve disk is sequentially opened from the initial opening position to an end portion opposite to the initial opening position during the compression and rebound strokes.

The valve disk may have a circular plate shape, and the eccentric disk may have a circular plate shape in which a center thereof is eccentric from a center of the valve disk, and have a diameter smaller than an external diameter of the valve disk.

A center of the asymmetric end portion of the eccentric disk may be spaced apart from the center of the initial opening position in a direction opposite to the initial opening position to form the initial opening position, and an end portion of the eccentric disk opposite to the asymmetric end portion may match the edge of the valve disk to form a final opening position.

A first hollow may vertically penetrate the center of the valve disk, a second hollow may vertically penetrate the center of the eccentric disk and has a diameter greater than that of the first hollow, and a center of the second hollow may be disposed eccentrically to one side of the first hollow.

The eccentric disk may have a circular plate shape, and an edge of the eccentric disk except for the asymmetric end portion may have a diameter equal to that of the valve disk and closely contact the valve disk A first hollow may vertically penetrate a center of the valve disk, a second hollow may vertically penetrate a center of the eccentric disk and has a diameter equal to that of the first hollow, and a center of the second hollow may be collinear with a center of the first hollow.

A round groove forming a curve concave toward a center of the eccentric disk from the initial opening position may be formed at a center of the asymmetric end portion, and a round protrusion forming a curve convex toward the initial opening position may be formed at each of both ends of the round groove.

One or more valve disks may be further connected to a rear surface of the eccentric disk.

DETAILED DESCRIPTION OF EMBODIMENTS

Hereinafter, preferred embodiments of the present invention will be described in detail with reference to the accompanying drawings.

The advantages and features of the present invention and methods for achieving them will become more apparent from the following embodiments that are described in detail in conjunction with the accompanying drawings.

However, it should be understood that the present invention is not limited to the following embodiments, and various modifications can be made without departing from the scope of the present invention. The embodiments set forth herein are provided so that this disclosure will be thorough and complete, and will fully convey the concept of the invention to those skilled in the art. The present invention should be defined by the appended claims.

In addition, detailed descriptions of well-known technologies or the like will be omitted since they would unnecessarily obscure the subject matters of the present invention.

Figure 1:
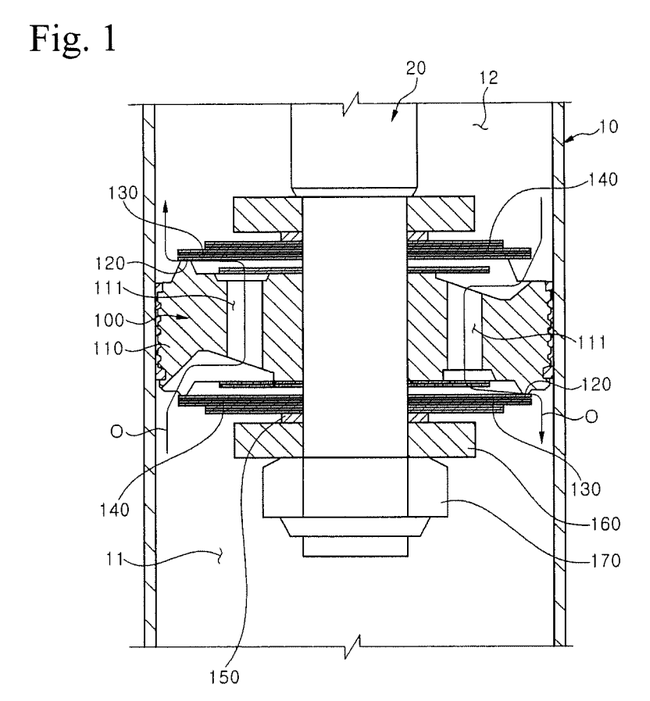
FIG. 1 is a cross-sectional view of a shock absorber for a railway vehicle according to a first embodiment of the present invention.
Figure 2:
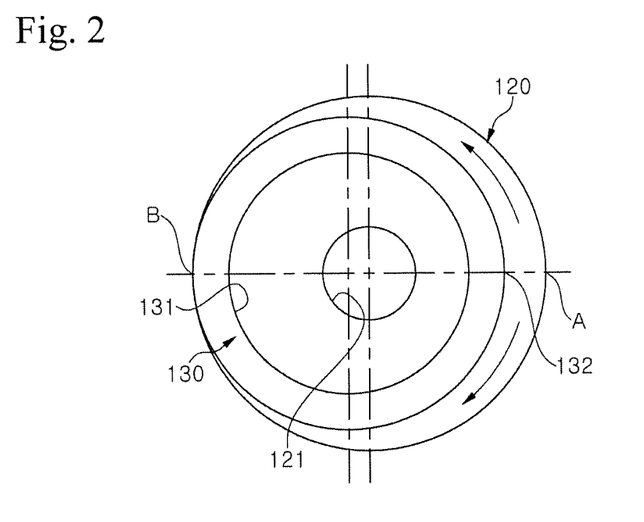
FIG. 2 is a cross-sectional view illustrating a shape of an eccentric disk in the shock absorber for the railway vehicle according to the first embodiment of the present invention.

FIG. 1 is a cross-sectional view of a shock absorber for a railway vehicle according to a first embodiment of the present invention, and FIG. 2 is a cross-sectional view illustrating a shape of an eccentric disk in the shock absorber for the railway vehicle according to the first embodiment of the present invention.

Figure 3:
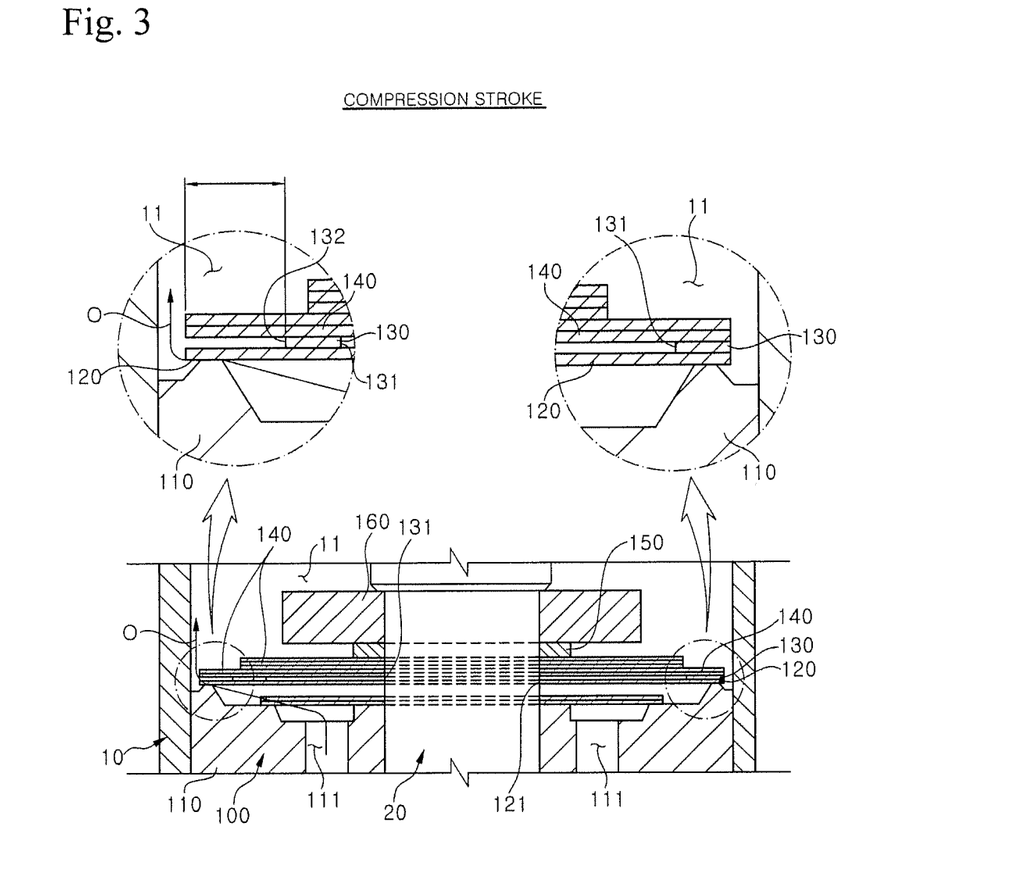
FIG. 3 is an operation state view showing a flow of a fluid during a compression stroke in a valve structure of the shock absorber according to the first embodiment of the present invention.
Figure 4:
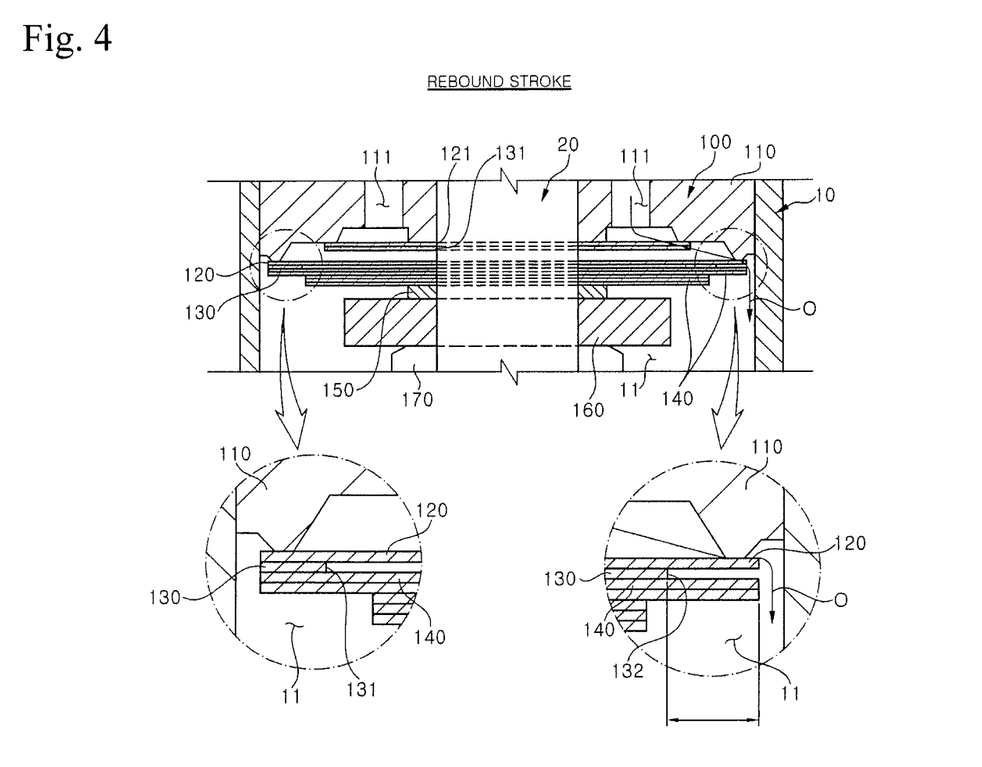
FIG. 4 is an operation state view showing a flow of a fluid during a rebound stroke in the valve structure of the shock absorber vehicle according to the first embodiment of the present invention.

FIG. 3 is an operation state view showing a flow of a fluid during a compression stroke in a valve structure of the shock absorber according to the first embodiment of the present invention, and FIG. 4 is an operation state view showing a flow of a fluid during a rebound stroke in the valve structure of the shock absorber according to the first embodiment of the present invention.

Figure 5:
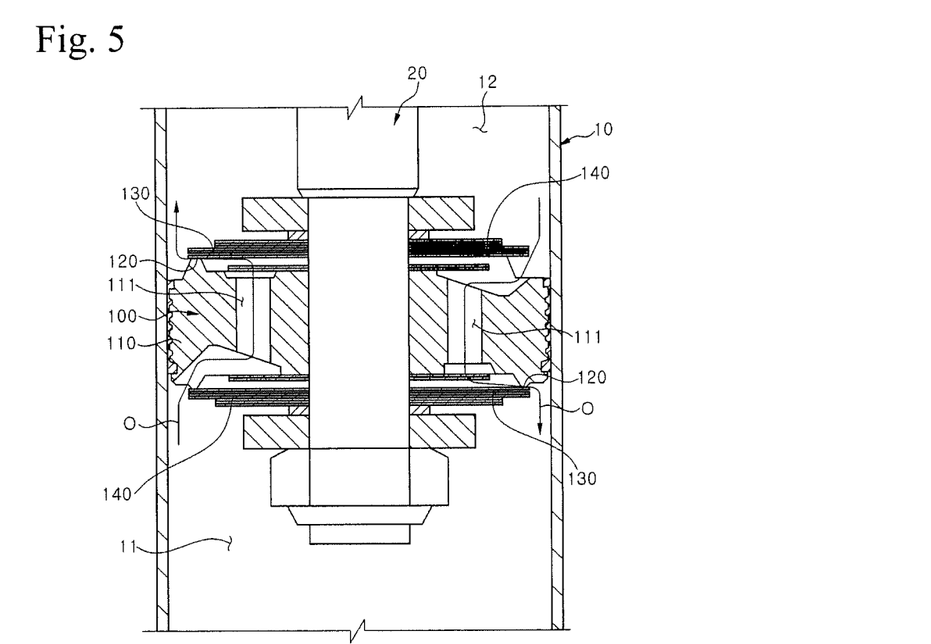
FIG. 5 is a cross-sectional view of a shock absorber for a railway vehicle according to a second embodiment of the present invention.
Figure 6:
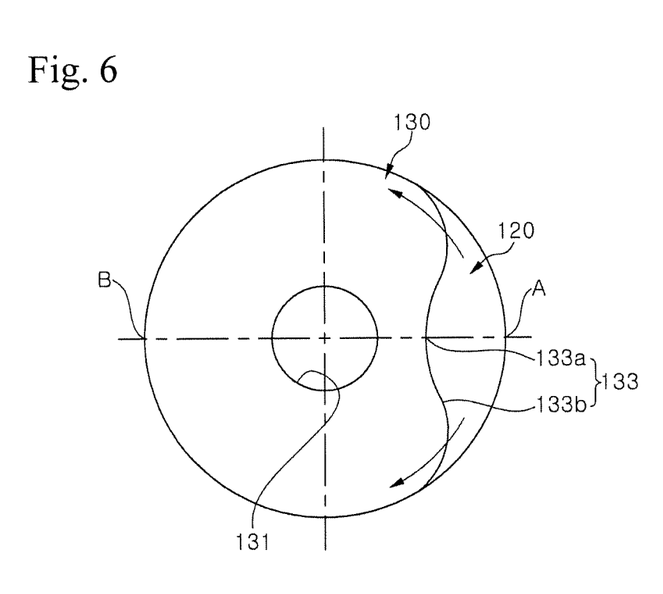
FIG. 6 is a cross-sectional view illustrating a shape of an eccentric disk in the shock absorber for the railway vehicle according to the second embodiment of the present invention.

FIG. 5 is a cross-sectional view of a shock absorber for a railway vehicle according to a second embodiment of the present invention, and FIG. 6 is a cross-sectional view illustrating a shape of an eccentric disk in the shock absorber for the railway vehicle according to the second embodiment of the present invention.

Figure 7:
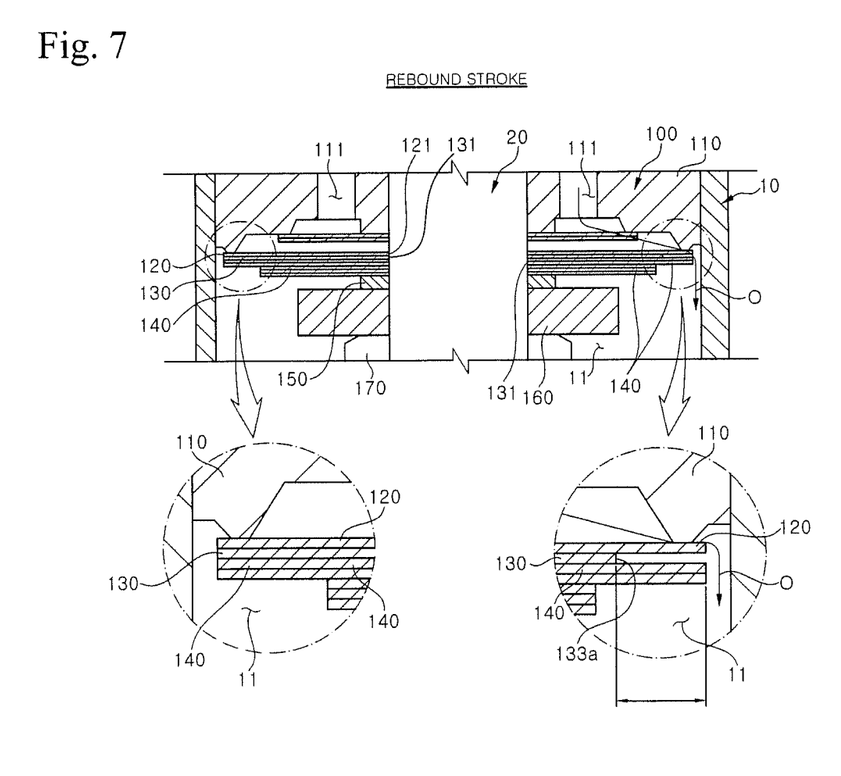
FIG. 7 is an operation state view showing a flow of a fluid during a compression stroke in a valve structure of the shock absorber according to the second embodiment of the present invention.
Figure 8:
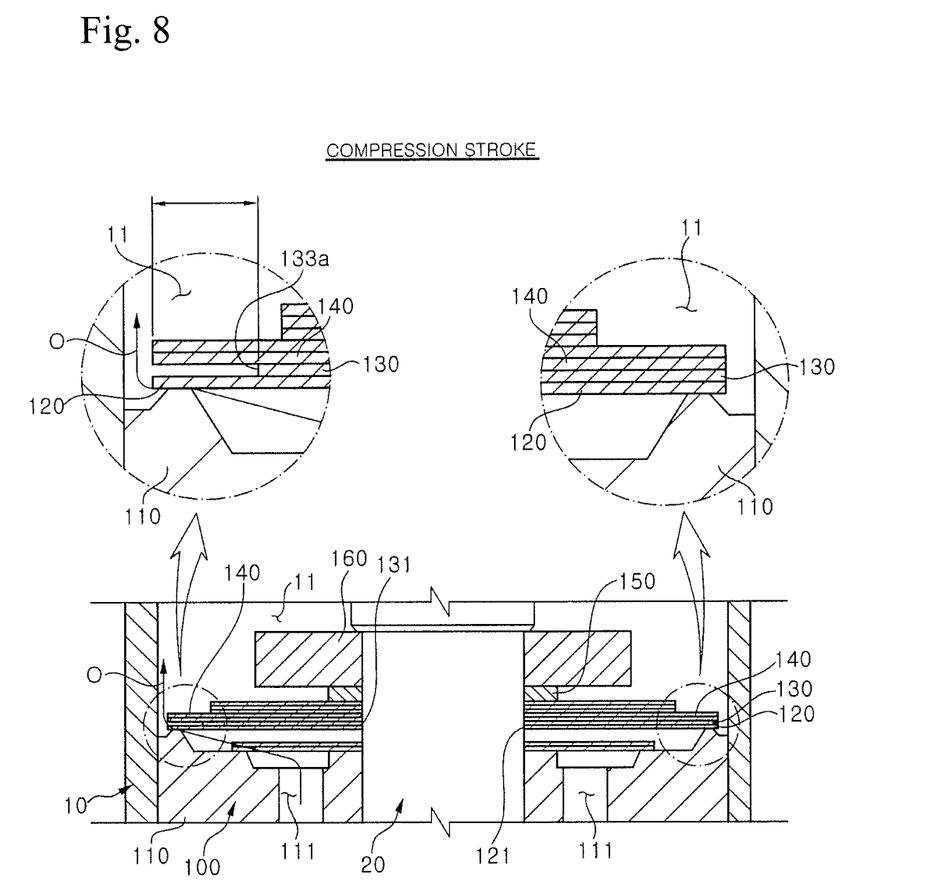
FIG. 8 is an operation state view showing a flow of a fluid during a rebound stroke in the valve structure of the shock absorber according to the second embodiment of the present invention.

FIG. 7 is an operation state view showing a flow of a fluid during a compression stroke in a valve structure of the shock absorber according to the second embodiment of the present invention, and FIG. 8 is an operation state view showing a flow of a fluid during a rebound stroke in the valve structure of the shock absorber according to the second embodiment of the present invention.

Referring to FIGS. 1 to 8, the shock absorber for the railway vehicle according to the present invention includes a cylinder 10, a piston rod 20, and a piston valve 100.

First, the cylinder 10 may have a cylindrical shape to form a space therein and may be filled with a fluid (oil or the like) O.

The interior of the cylinder 10 is partitioned into a compression chamber 11 on a lower side thereof and a rebound chamber 12 on an upper side thereof by the piston valve 100.

The piston rod 20 has one end connected to the piston valve 100 described later to reciprocate in compression and rebound stroke directions and the other end connected to a vehicle.

The piston valve 100 is connected to one end of the piston rod 20 inserted into the cylinder 10 and partitions the interior of the cylinder 10 into the compression chamber 11 and the rebound chamber 12.

To this end, the piston valve 100 includes a body 110, a valve disk 120, and an eccentric disk 130.

First, the body 110 has a cylindrical shape corresponding to an internal diameter of the cylinder 10 and moves in the compression and rebound stroke directions in a state in which a side surface of the body 110 closely contacts an inner peripheral surface of the cylinder 10.

The side surface of the body 110 moves in the compression or rebound stroke direction in a state of closely contacting the inner peripheral surface of the cylinder 10.

A hollow vertically penetrates a center of the body 110 such that one end of the piston rod 20 extending toward the inside of the cylinder 10 is connected to the body 110.

In addition, a plurality of main passages 111 vertically penetrate the body 110 such that the fluid O moves toward the compression chamber 11 and the rebound chamber 12.

Each of the main passages 111 is divided into a compression side and a rebound side. The valve disk 120 described later closely contacts an outlet side of each of the main passages 111, such that a damping force is generated.

On the contrary, an inlet side of each of the main passages 111 communicates with the compression chamber 11 and the rebound chamber 12 in a state of being spaced apart from the valve disk 120, such that the fluid O is introduced therethrough.

The valve disk 120 is connected corresponding to upper and lower portions of the body 110. An edge of the valve disk 120 closely contacts the outlet side of each of the main passages 111.

The valve disk 120 may be manufactured in a circular plate shape by using a metal material having certain elasticity so as to return to an original shape after deformation.

A first hollow 121 vertically penetrates a center of the valve disk 120, such that the piston rod 20 is connected to the valve disk 120.

As described above, the valve disk 120 blocks the outlet side of each of the main passages 111 in a state in which the edge of the valve disk 120 closely contacts a lower end of the body 110.

For example, as illustrated in FIGS. 3, 4, 7, and 8, when compression and rebound strokes are performed, the fluid O is discharged in a direction opposite to a stroke direction while pushing the edge of the valve disk 120 and opening the valve disk 120.

At this time, a damping force is generated while the edge of the valve disk 120 is moved in a direction opposite to the outlet side of each of the main passages 111 by a pressure of the fluid O.

An initial opening position A, which is supported to an asymmetric end portion 132 of the eccentric disk 130 described later, is formed at one end of the valve disk 120. A final opening position B opposite to the initial opening position A is formed at the other end of the valve disk 120.

The initial opening position A is a position to which the smallest supporting force is applied by the eccentric disk 130 described later, and the initial opening position A is first opened. The final opening position B is a position to which the greatest supporting force is applied by the eccentric disk 130, and is finally opened.

The eccentric disk 130 according to the first embodiment of the present invention is disposed on each of the upper and lower portions of the body 110 so as to closely contact a rear surface of the valve disk 120 as illustrated in FIGS. 1 to 4.

The eccentric disk 130 may be manufactured in a circular plate shape by using a metal material having certain elasticity. A second hollow 131 vertically penetrates a center of the eccentric disk 130.

The eccentric disk 130 is formed to have a diameter smaller than that of the valve disk 120. A center of the second hollow 131 does not match a center of the valve disk 120 and is disposed eccentrically to one side.

In particular, the asymmetric end portion 132 disposed eccentrically to one side is formed at a portion of an edge of the eccentric disk 130 as illustrated in FIGS. 1 to 4.

The asymmetric end portion 132 is spaced apart from the initial opening position A of the valve disk 120 in a direction opposite to the initial opening position A as illustrated in FIG. 2.

A center of the asymmetric end portion 132 is disposed parallel to a center of the initial opening position A in a horizontal direction.

The center of the second hollow 131 does not match the center of the first hollow 121 and is disposed eccentrically to the final opening position B of the valve disk 120.

As described above, the eccentric disk 130 is a structure in which the valve disk 120 is sequentially opened from the initial opening position A to the final opening position B opposite to the initial opening position A during compression and rebound strokes.

That is, since the asymmetric end portion 132 is spaced apart from the initial opening position A in a direction opposite to the initial opening position A, the initial opening position A of the valve disk 120 is first opened during compression and rebound strokes.

On the contrary, since the other end portion of the eccentric disk 130 opposite to the asymmetric end portion 132 supports the final opening position B of the valve disk 120 with a relatively great force, the final opening position B of the valve disk 120 is opened later during compression and rebound strokes.

An eccentric disk 130 according to a second embodiment of the present invention may have a circular plate shape having a diameter equal to that of the valve disk 120 as illustrated in FIGS. 5 to 8.

The eccentric disk 130 may be manufactured in a circular plate shape by using a metal material having certain elasticity so as to return to an original shape after deformation.

A second hollow 131 vertically penetrates a center of the eccentric disk 130. The second hollow 131 has a diameter equal to that of the first hollow 121. A center of the second hollow 131 is collinear with a center of the first hollow 121.

In particular, an asymmetric end portion 133 concave toward one side is formed at a portion of an edge of the eccentric disk 130 as illustrated in FIGS. 5 to 8.

The asymmetric end portion 133 is spaced apart from the initial opening position A of the valve disk 120 in a direction opposite to the initial opening position A.

A round groove 133a forming a curve concave toward the center of the eccentric disk 130 from the initial opening position A is formed at the center of the asymmetric end portion 133.

A round protrusion 133b forming a curve convex toward the initial opening position A is formed at each of both ends of the round groove 133a.

A center of the round groove 133a is disposed parallel to a center of the initial opening position A in a horizontal direction as illustrated in FIG. 6.

That is, since the center of the round groove 133a is spaced apart from the initial opening position A, a supporting force for the initial opening position A may be reduced during compression and rebound strokes.

One end of the round protrusion 133b is connected to both ends of the round groove 133a, and the other end of the round protrusion 133b is disposed at an edge of the valve disk 120 while forming a curve toward the final opening position B.

For example, after the center of the initial opening position A supported with the smallest force by the round groove 133a is first opened during compression and rebound strokes, the valve disk 120 is sequentially opened from the initial opening position A to the final opening position B to move the fluid O.

That is, since the asymmetric end portion 133 is spaced apart from the initial opening position A in a direction opposite to the initial opening position A, the initial opening position A of the valve disk 120 is first opened during compression and rebound strokes.

On the contrary, since the other end portion of the eccentric disk 130 opposite to the asymmetric end portion 133 supports the final opening position B of the valve disk 120 with a relatively great force, the final opening position B of the valve disk 120 is opened later during compression and rebound strokes.

Therefore, since the valve disk 120 is continuously opened from the initial opening position A during compression and rebound strokes, a section in which the valve disk 120 is opened may realize a constant and soft damping force.

On the other hand, one or more valve disks 140 may be further connected to a rear surface of the eccentric disk 130, and a retainer 150 may be connected to a rear surface of each of the valve disks 140.

In addition, a washer 160 may be connected to a rear surface of the retainer 150. The piston rod 20 may penetrate and connect to the retainer 150 through a hollow of the washer 160. A nut 170 may be screw-connected to a lower end of the piston rod 20.

As a result, according to the present invention, the eccentric disk 130 is disposed on the rear surface of the valve disk 120, so that a supporting force for the initial opening position A of the valve disk 120 may be set to a relatively low value.

Therefore, since the valve disk 120 is continuously opened from the initial opening position A during compression and rebound strokes, it is possible to control a damping force in a low speed section and realize a soft damping force due to the nonoccurrence of a blow-off phenomenon.

According to the present invention, an eccentric disk is disposed on a rear surface of a valve disk to set a supporting force for an initial opening position of the valve disk to a relatively low value and continuously open the valve disk from the initial opening position of the valve disk during strokes, thereby controlling a damping force in a low speed section and realizing a soft damping force due to nonoccurrence of a blow-off phenomenon.

While the shock absorbers for the railway vehicle according to the embodiments of the present invention have been described with reference to the specific embodiments, it will be apparent to those skilled in the art that various changes and modifications may be made without departing from the spirit and scope of the invention as defined in the following claims.

The shock absorbers for the railway vehicle according to specific embodiments of the present invention have been described, but it is obvious that various modifications can be made thereto without departing from the scope of the present invention.

Therefore, the scope of the present invention should not be limited to the embodiments described above, and will be determined by the appended claims and equivalents thereof.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: cylinder | 11: compression chamber |
| 12: rebound chamber | 20: piston rod |
| 100: piston valve | 110: body |
| 111: main passage | 120: valve disk |
| 121: first hollow | 130: eccentric disk |
| 131: second hollow | 132: asymmetric end portion |
| 133: asymmetric end portion | 133a: round groove |
| 133b: round protrusion | 140: valve disk |
| 150: retainer | 160: washer |
| 170: nut | A: initial opening position |
| B: final opening position | O: fluid |

What is claimed is:

1. A shock absorber for a railway vehicle comprising:
a piston valve partitioning interior of a cylinder into a compression chamber and a rebound chamber, the cylinder being filled with a fluid,
wherein the piston valve comprises:
a body defining a main passage through which the fluid moves during compression and rebound strokes;
a pair of valve disks closely contacting upper and lower portions of the body, respectively, to block an outlet side of the main passage and opening the outlet side of the main passage to generate a damping force during compression and rebound strokes; and
a pair of eccentric disks closely contacting and supporting a rear surface of the pair of valve disks, respectively, at the upper and lower portions of the body, wherein an asymmetric end portion on one side of an edge of each of the pair of eccentric disks is spaced apart from a center of an initial opening position of an edge of each of the pair of valve disks in a direction opposite to the initial opening position, and each of the pair of valve disks is sequentially opened from the initial opening position to an end portion opposite to the initial opening position during the compression and rebound strokes,
wherein each of the pair of valve disks and each of the pair of eccentric disks has a circular ring shape in which a radius of each of the pair of eccentric disks is uniform,
wherein a center of each of the pair of valve disks is offset from that of each of the pair of eccentric disks.

2. The shock absorber according to claim 1, wherein each of the pair of eccentric disks has a diameter smaller than an external diameter of each of the pair of valve disks.

3. The shock absorber according to claim 2, wherein a center of the asymmetric end portion of each of the pair of eccentric disks is spaced apart from the center of the initial opening position in a direction opposite to the initial opening position to form the initial opening position, and an end portion of each of the pair of eccentric disks opposite to the asymmetric end portion matches the edge of each of the pair of valve disks to form a final opening position.

4. The shock absorber according to claim 2, wherein a first hollow vertically penetrates a center of each of the pair of valve disks, a second hollow vertically penetrates a center of each of the pair of eccentric disks and has a diameter greater than that of the first hollow, and a center of the second hollow is disposed eccentrically to one side of the first hollow.

5. The shock absorber according to claim 1, wherein each of the pair of eccentric disks has a circular plate shape, and an edge of each of the pair of eccentric disks except for the asymmetric end portion has a diameter equal to that of each of the pair of valve disks and closely contacts each of the pair of valve disks.

6. The shock absorber according to claim 5, wherein a first hollow penetrates a center of each of the pair of valve disks, a second hollow vertically penetrates a center of each of the pair of eccentric disks and has a diameter equal to that of the first hollow, and a center of the second hollow is collinear with a center of the first hollow.

7. The shock absorber according to claim 1, wherein a round groove forming a curve concave toward a center of each of the pair of eccentric disks from the initial opening position is formed at a center of the asymmetric end portion, and a round protrusion forming a curve convex toward the initial opening position is formed at each of both ends of the round groove.

8. The shock absorber according to claim 1, wherein one or more valve disks are further connected to a rear surface of each of the pair of eccentric disks.

* * * * *